United States Patent [19]

Oishi

[11] Patent Number: 4,750,075
[45] Date of Patent: Jun. 7, 1988

[54] MAGNETIC DISK CARTRIDGE WITH LINERS AND A WELDED LIFTER

[75] Inventor: Kengo Oishi, Kanagawa, Japan

[73] Assignee: Fuji Photo Film Co., Ltd., Kanagawa, Japan

[21] Appl. No.: 894,522

[22] Filed: Aug. 8, 1986

[30] Foreign Application Priority Data

Nov. 6, 1985 [JP] Japan .............................. 60-169736[U]

[51] Int. Cl.⁴ .............................................. G11B 23/03
[52] U.S. Cl. ..................................................... 360/133
[58] Field of Search .......................................... 360/133

[56] References Cited

U.S. PATENT DOCUMENTS

| 4,149,207 | 4/1979 | Porter | 360/133 |
| 4,510,546 | 4/1985 | Asami | 360/133 |
| 4,620,247 | 10/1986 | Papciak | 360/133 |

Primary Examiner—A. J. Heinz
Attorney, Agent, or Firm—Sughrue, Mion, Zinn, Macpeak, and Seas

[57] ABSTRACT

A magnetic disk cartridge in which a rotatable disk sheet is separated on both sides from the case by liners for cleaning the recording surfaces. A lifter is welded to one inner wall of the case and is cantilevered against the liners and disk sheet to force the liners against the disk sheet.

5 Claims, 1 Drawing Sheet

MAGNETIC DISK CARTRIDGE WITH LINERS AND A WELDED LIFTER

BACKGROUND OF THE INVENTION

1. Field of the Invention

This invention relates to a magnetic disk cartridge in which a disk-shaped magnetic recording medium which is extremely thin, namely, a magnetic disk sheet, is rotatably supported. More particularly, the invention relates to a magnetic disk cartridge in which the sheet surface cleaning means is improved.

2. Background Art

As is well known, a floppy disk has been proposed in the art. The floppy disk is made by forming magnetic layers on both sides of a disk-shaped substrate which is made of flexible polyester sheet. Signals are magnetically recorded on the magnetic layers with a magnetic head while the floppy disk is being rotated. As the floppy disk can be readily handled and is low in manufacturing cost, it is extensively employed as a recording medium for computers.

On the other hand, a so-called "micro floppy disk" has been put in practical use. The micro floppy disk utilizes the above-described advantages of the floppy disk and the advantage of the magnetic recording operation in which the recording medium, unlike a silver salt film, can be repeatedly used. The micro floppy disk is made smaller in size than the floppy disk so that it can be more readily handled.

In general, in magnetically writing data in the above-described magnetic disk sheet or reading them from the disk sheet, the writing head or reading head is slidably moved radially of the magnetic disk sheet (in practice, the head being moved in a contactless mode). Accordingly, if, in the data writing or reading operation, the magnetic head is unsatisfactorily confronted with the magnetic disk sheet or dust enters beneath the head gap, then the signal inputting or outputting operation is made irregular, thus causing dropouts. In a 3.5 inch magnetic disk cartridge, in order to improve its reliability, the case is made of relatively hard material, and the opening through which the magnetic head is brought into contact with the magnetic disk sheet is provided with a dust-proof shutter. Furthermore, liners of rayon or polyester unwoven cloth are interposed between the magnetic disk sheet and the case inner walls in such a manner that the liners are slightly pushed against the recording surfaces of the magnetic disk sheet so that dust or small particles are removed from the disk sheet while the sheet is being rotated. In addition, a lifter of polyethylene terephthalate (PET) is disposed between the case inner wall and the liner. The lifter is in the form of a rectangular sheet having one end portion fixedly secured to the case inner wall and the other end portion which rises obliquely in the case. Therefore, the liners are pushed against the surfaces of the magnetic disk sheet by the lifter.

However, the conventional lifter of PET resin soon relaxes. That is, it is impossible for the conventional lifter to stably push the magnetic disk sheet over a long period.

On the other hand, the lifter is secured with a double-sided adhesive tape or an instantaneous adhesive agent. However, the fixing method manifests considerably low productivity in the manufacture of the magnetic disk cartridge.

SUMMARY OF THE INVENTION

In view of the foregoing, an object of this invention is to provide a magnetic disk cartridge having a lifter which is substantially free from permanent set in fatigue.

A further object of the invention is to provide a lifter which permits assembling the cartridge with high efficiency.

The foregoing objects of the invention has been achieved by the provision of a magnetic disk cartridge comprising a magnetic disk sheet rotatably supported in a case, liners provided between the magnetic disk and the case inner walls to clean the recording surfaces of the magnetic disk sheet, and a lifter for pressing the liners against the recording surfaces of the magnetic disk sheet. According to the invention, the lifter is fixedly welded to the case inner wall by ultrasonic welding.

BRIEF DESCRIPTION OF THE DRAWINGS

One preferred embodiment of this invention will be described with reference to the accompanying drawings.

DETAILED DESCRIPTION OF THE PREFERRED EMBODIMENTS

Figure 1:
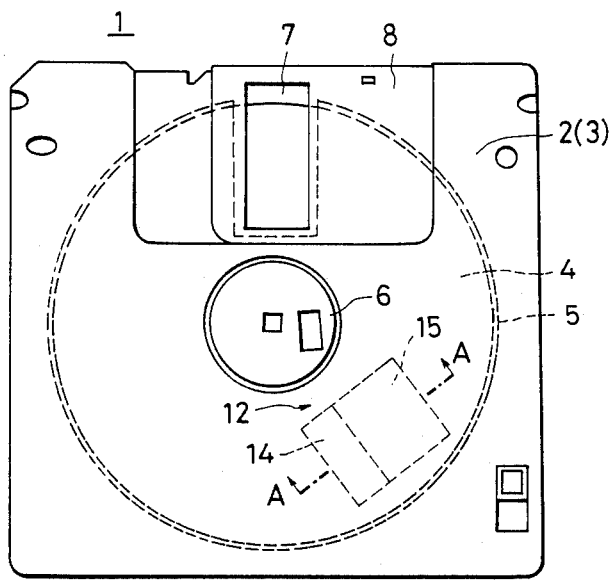
FIG. 1 is a plan view outlining a magnetic disk cartridge which is an embodiment of the invention.

A magnetic disk cartridge 1, as shown in FIG. 1, comprises an upper half 2 and a lower half 3 which are made of relatively hard plastic resin to form a case. The case accommodates a magnetic recording medium, namely, a magnetic disk sheet 4, liners 5 of unwoven cloth or the like to protect and clean the sheet 4, and a lifter 12 to suitably push the liners 5 against the surfaces of the disk sheet 4. The lifter 12 is shown in better detail in FIGS. 2 and 3. The magnetic disk sheet 4 has a center core 6 at its center which is held by the rotating means of a signal recording and reproducing device (not shown). The center core 6 appears at the surface of the case 1. The case 1 has a rectangular opening 7 through which the magnetic head (not shown) of the signal recording and reproducing device can be brought into sliding contact with the disk 4. The case is provided with a slidable dust-proof shutter 8 which is adapted to close the opening 7 when the cartridge is not used.

Figure 2:
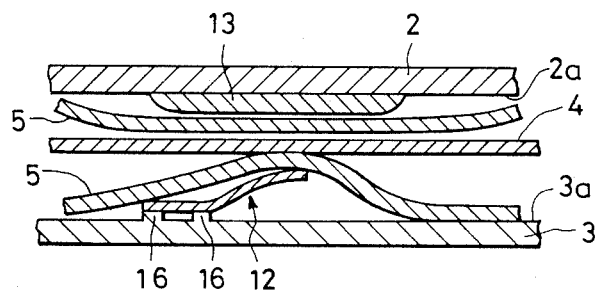
FIG. 2 is an enlarged sectional view taken along line A—A in FIG. 1.

The liners 5 are provided on both sides (the upper and lower surfaces) of the magentic disk sheet 4, as shown in FIG. 2. Each of the liners 5 is substantially in the form of an annular disk covering the entire sheet recording surface of the disk sheet 4. In order to facilitate the action of the lifter 12, a protrusion or a plurality of ribs 13 are arranged on the case inner wall 2a of the upper half case 2 confronting the case inner wall 3a of the lower half case 3 on which the lifter 12 is provided, in such a manner that the ribs 13 are in parallel with the tangent of the magnetic disk sheet 4 and they are disposed radially along the disk sheet 4 (cf. FIG. 2).

Figure 3:
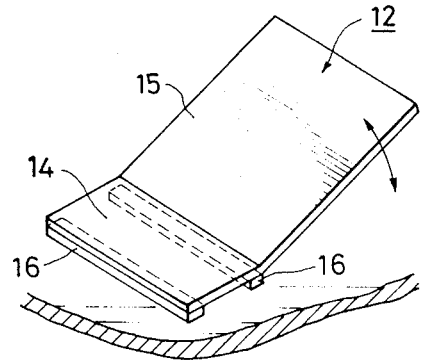
FIG. 3 is a perspective view of a lifter in the magnetic disk cartridge shown in FIGS. 1 and 2.

The lifter 12, as shown in FIG. 3, is a plate-shaped member which is made of polycarbonate or polysulfone so that it can be readily welded to the upper and the lower half case 3, which is made of ABS resin. The lifter 12 comprises a fixing part 14 and a riser 15 which are formed, for instance, by heat set treatment.

On the other hand, two rib-shaped bonding projections 16 extend from the case inner wall 3a of the lower half 3 with which the fixing part 14 of the lifter 12 confronts. When the lifter 12 is secured to the case inner wall by ultrasonic welding, the bonding projections 16 are melted by the ultrasonic energy and welded to the fixing part 14 of the lifter 12.

Thus, the lifter 12 can be readily secured to the case inner wall 3a by ultrasonic welding. Therefore, the lifters 12 can be automatically secured to the case inner walls 3a of the lower halves 3 by using a suitable machine. As was described before, the material of the lift is polycarbonate, for instance, and therefore the lifter 12 is relatively free from the creep phenomenon, and is scarcely relaxes when compared with the conventional lifter.

In the above-described embodiment, the two bonding projections 16 are formed in such a manner that they are extended in the widthwise direction of the lifter 12. However, it goes without saying that the bonding projections are not limited to that shown in FIG. 3.

As was described above, the lifter 12 in the magnetic disk cartridge according to the invention is made of a material which can be readily welded to the upper and the lower half and scarcely relaxes when compared with PET resin. The welding of the lifter 12 to the lower half case 3 can be quickly and continuously carried out by ultrasonic welding. Furthermore, the difficulty that the pressing force of the liners is decreased by the permanent set in fatigue is eliminated according to the invention, so that the surface of the magnetic disk sheet can be effectively used. Also, the running torque can be stabilized. Thus, according to the invention, the magnetic disk cartridge can be assembled with high efficiency, and its lifter is not settled over a long period. That is, it remains serviceable for a long period.

What is claimed is:

1. A magnetic disk cartridge comprising:
   a case;
   a magnetic disk sheet rotatably supported in said case;
   liners provided between said magnetic disk sheet and two inner walls of said case to clean recording surfaces of said magnetic disk sheet; and
   a lifter for pressing said liners against the recording surfaces of said magnetic disk sheet wherein said lifter is fixedly welded to one of said inner walls, said lifter being made of at least one of polycarbonate and polysulfone; and a bonding projection protruding from the part of said one inner wall to which said lifter is welded.

2. A disk cartridge as recited in claim 1, wherein said lifter is ultrasonicaly welded to said one inner wall.

3. A disk cartridge as recited in claim 1, wherein said lifter comprises a first planar part parallel and welded to said one inner wall and a second part integral with said first part and inclined away from said one inner wall.

4. A disk cartridge as recited in claim 3, further comprising at least one rib projecting from the other of said two inner walls opposite said second part, said ribs being parallel to a tangent of said rotatable disk sheet.

5. A magnetic disk cartridge comprising:
   a case comprising a hard resin, one of two inner walls of said case including a bonding projection;
   a magnetic disk sheet rotatably supported in said case;
   liners provided between said magnetic disk sheet and said two inner walls for cleaning recording surfaces of said magnetic disk sheet;
   a lifter for pressing said liners against the recording surfaces of said magnetic disk sheet, wherein said lifter comprises a first planar part ultrasonically welded to said projection and a second part integral with said first part and inclined away from said one inner wall, said lifter being made of at least one of polycarbonate and polysulfone; and
   at least one rib projecting from the other of said two inner walls opposite said second part and being parrallel to a tangent of said rotatable disk sheet.

* * * * *